United States Patent
Götz et al.

(10) Patent No.: US 6,913,301 B2
(45) Date of Patent: Jul. 5, 2005

(54) DEVICE FOR ADJUSTING THE EFFECTIVE LENGTH OF A SLING AND FOR LIFTING LOADS

(75) Inventors: Rolf Götz, Übach-Palenberg (DE); Willi Panhausen, Gangelt (DE)

(73) Assignee: Spanset Inter AG, Oetwil am See (CH)

( * ) Notice: Subject to any disclaimer, the term of this patent is extended or adjusted under 35 U.S.C. 154(b) by 0 days.

(21) Appl. No.: 10/043,016

(22) Filed: Jan. 8, 2002

(65) Prior Publication Data

US 2003/0132183 A1 Jul. 17, 2003

(30) Foreign Application Priority Data

Jan. 10, 2001 (DE) .......................... 101 00 993

(51) Int. Cl.[7] .............................. B66C 1/12; B66C 1/18
(52) U.S. Cl. ..................... 294/74; 294/82.11; 24/598.5; 24/598.6
(58) Field of Search ................. 294/74, 82.1, 82.11, 294/82.12, 82.14, 170; 24/573.09, 592.1, 598.5, 598.6; 212/242; D8/356; 188/65.4

(56) References Cited

U.S. PATENT DOCUMENTS

| | | | | |
|---|---|---|---|---|
| 852,285 A | * | 4/1907 | Murray | 294/82.1 |
| 1,361,249 A | * | 12/1920 | Giffin | 294/82.1 |
| 1,441,737 A | * | 1/1923 | Mickelson | 294/74 |
| 2,552,758 A | * | 5/1951 | Andersen | 294/82.1 |
| 2,789,003 A | * | 4/1957 | Wirkkala | 294/74 |
| 2,793,904 A | * | 5/1957 | Gale | 294/74 |
| 3,002,780 A | * | 10/1961 | Eggeman | 294/74 |
| 3,092,412 A | * | 6/1963 | Drake | 294/82.1 |
| 4,007,808 A | * | 2/1977 | Conley et al. | 24/599.8 |
| 4,019,770 A | * | 4/1977 | Poelma et al. | 294/82.12 |
| 4,200,325 A | * | 4/1980 | Johnson | 294/74 |
| 4,492,399 A | * | 1/1985 | Randen et al. | 294/74 |
| 5,103,755 A | * | 4/1992 | Garrett | 294/82.1 |
| D376,095 S | * | 12/1996 | Curtis | D8/356 |
| 6,543,826 B1 | * | 4/2003 | Aston | 294/74 |

FOREIGN PATENT DOCUMENTS

| | | | | |
|---|---|---|---|---|
| CH | 576909 | * | 6/1976 | 294/74 |
| DE | 909393 | * | 4/1954 | 294/82.11 |
| DE | 0229100 | * | 10/1985 | 294/82.1 |
| FR | 069162 | * | 10/1958 | 294/82.12 |
| GB | 2050998 | * | 1/1981 | |
| JP | 0108357 | * | 8/1979 | 294/82.11 |
| JP | 405162969 | * | 6/1993 | 294/82.11 |
| SU | 1127836 | * | 12/1984 | 294/74 |

* cited by examiner

*Primary Examiner*—Eileen D. Lillis
*Assistant Examiner*—Paul T. Chin
(74) *Attorney, Agent, or Firm*—Proskauer Rose LLP

(57) ABSTRACT

A device to adjust the effective length of a sling during the transport of a load is designed as a continuous loop with a carrier part. The carrier part has projections located at each of two opposed spaced sites. Each of said projections supports a segment of the sling. The carrier part also has an opening through which a loop segment of the sling is guided.

10 Claims, 3 Drawing Sheets

DEVICE FOR ADJUSTING THE EFFECTIVE LENGTH OF A SLING AND FOR LIFTING LOADS

BACKGROUND OF THE INVENTION

The invention relates to a device for adjusting the length of a stop means designed as a continuous loop, in particular a textile band folded or woven into a circular loop, or a continuous rope. Such stop means are used to secure spaced apart attachment points of a bulky load to the hook of a crane for transport.

A large number of circular loops and continuous loops are known as stop means from the old DIN 61360 or the new DIN EN 1492-1 and -2. In this case, metal parts like connectors, hooks or shackles are used for coupling the load to the stop means. The stop means themselves here each have a fixed length, and can only be brought to the length required to solve the respective transportation task in conjunction with stop chains and suitable devices for shortening these chains.

Since proceeding in this manner is often expensive and cumbersome, a transition was made in practice to shorten the stop means by looping the crane hook. However, this possibility is limited by the fact that the stop means in the crane hook must lie next to each other. Otherwise, there is a danger that the stop means will become damaged through squeezing and frictional wear. For this reason, slinging the crane hook only allows a very slight shortening of the stop means.

SUMMARY OF THE INVENTION

The object of the invention is to provide a device for adjusting the length of a stop means of the kind described above over a wide range that is easy to use and inexpensive to manufacture. In addition, a device is to be specified in which a stop means of the described kind is used, and in which the length of the stop means can also be easily tailored to the respective requirements.

This object is achieved on the one hand by a device for adjusting the length of a stop means designed as a continuous loop, in particular a textile band folded or woven into a circular loop, or a continuous rope, which is equipped with a carrier part that exhibits a projection at two opposed, spaced sides, around which a respective section of the stop means can be slung.

The device according to the invention, which is preferably manufactured as a forged metal part, is intended to be positioned freely suspended between the respective lifting device and load. By slinging the stop means with a respective one of the two sections leading from the lifting device to the load around one of the projections, the affected sections are divided into an essentially vertical running segment and a segment running at an angle away from the carrier part to the respective stop point of the transported load. By simply adjusting height of the carrier part, the length of the stop means, and hence the distance between the load and lifting device, can be easily set. In this case, upwardly shifting the carrier part shortens the effective length of the stop means owing to the accompanying elongation of the angled segment of the stop means. In like manner, a downward shift of the carrier part increases the length of the stop means effective during transport.

The projections must here be designed in such a way as to form an optimal guide for the stop element slung around them. One embodiment of the invention particularly suited to this end is characterized by the fact that the projections are hook-shaped. As an alternative or supplementary thereto, the projections can also exhibit bulges or recesses, which guide the stop means. In particular if the projections are designed as hooks, it is additionally advisable for the projections to exhibit markings, which denote a critical angle of the segment of the stop means leading away from the respective projection. In this way, the stop means are reliably prevented from being overloaded in the area of the slinging that takes place in the area of the projections.

Another advantageous variant of the device according to the invention is characterized in that the carrier part carries a deflection element in the area between the projections to deflect another segment of the stop means. In the area of the stop points of the load, loop segments can be formed that facilitate an easy, secure attachment of the load. In addition, this prevents the segment of the stop means that directly links the stop points of the load from abutting the load. In particular, loads that have no defined stop points can be reliably transported in this way. In this case, it is beneficial in terms of providing a stable orientation of the carrier part if the surface over which the deflection element is secured to the carrier part being located in a plane situated over the projections with the device in the operating position. The deflection element is here advantageously designed in such a way that its surface over which the stop means is routed lies under the projections. The reliable, stable alignment of the carrier part is also ensured by the fact that the deflection element and projections are arranged symmetrically to the middle axis of the carrier part, which is vertically aligned in the operating position.

Depending on the type of stop means and the respective transport task, it may be expedient to pivot the deflection element in an opening in the carrier part. In this design, for example, a spring hook or comparable hook elements can be used as the deflection element. As an alternative, however, the deflection element can be designed as a hook rigidly connected with the carrier part. In this case, a carrier part that is simple and inexpensive to manufacture is available, which is optimally adjusted to the respective load during transport.

Safety during transport of a load can be further increased by having the carrier part exhibiting an opening lying in particular opposite the deflection element, through which a loop segment of the stop means can be guided. This loop segment will generally involve that segment of the stop means with which the respective lifting device will be coupled. In this way, the carrier pert is held in a stably aligned position by a force directed in a specific direction.

On the other hand, the above object is achieved by a device for lifting a load, which is equipped with a stop means designed as a continuous loop, in particular a textile band folded or woven into a circular loop, or a continuous rope, which connects a lifting device with the load, and with a device for adjusting the effective length of the stop means, which has a carrier part that exhibits a projection at two opposed, spaced sides, around which a respective section of the stop means linking the lifting device with a respective stop point of the load can be slung. For reasons already explained above, the carrier plate here bears a deflection element between the projections, which deflects the segment of the stop means over which the two segments of the stop means linking the lifting device with the load are connected with each other on the side of the carrier part allocated to the load. For reasons already expressed above as well, it also makes sense to ensure a particularly reliable transport of the load for the carrier part to have an opening through which a loop segment of the stop means is routed, over which the segments of the stop means that link the load with the lifting device are coupled with the lifting device.

BRIEF DESCRIPTION OF THE DRAWINGS

Additional advantageous embodiments of the invention are specified in the dependent claims, and will be explained in greater detail in conjunction with the embodiment described below based upon a drawing. Shown on:

DETAILED DESCRIPTION OF THE INVENTION

Figure 1:
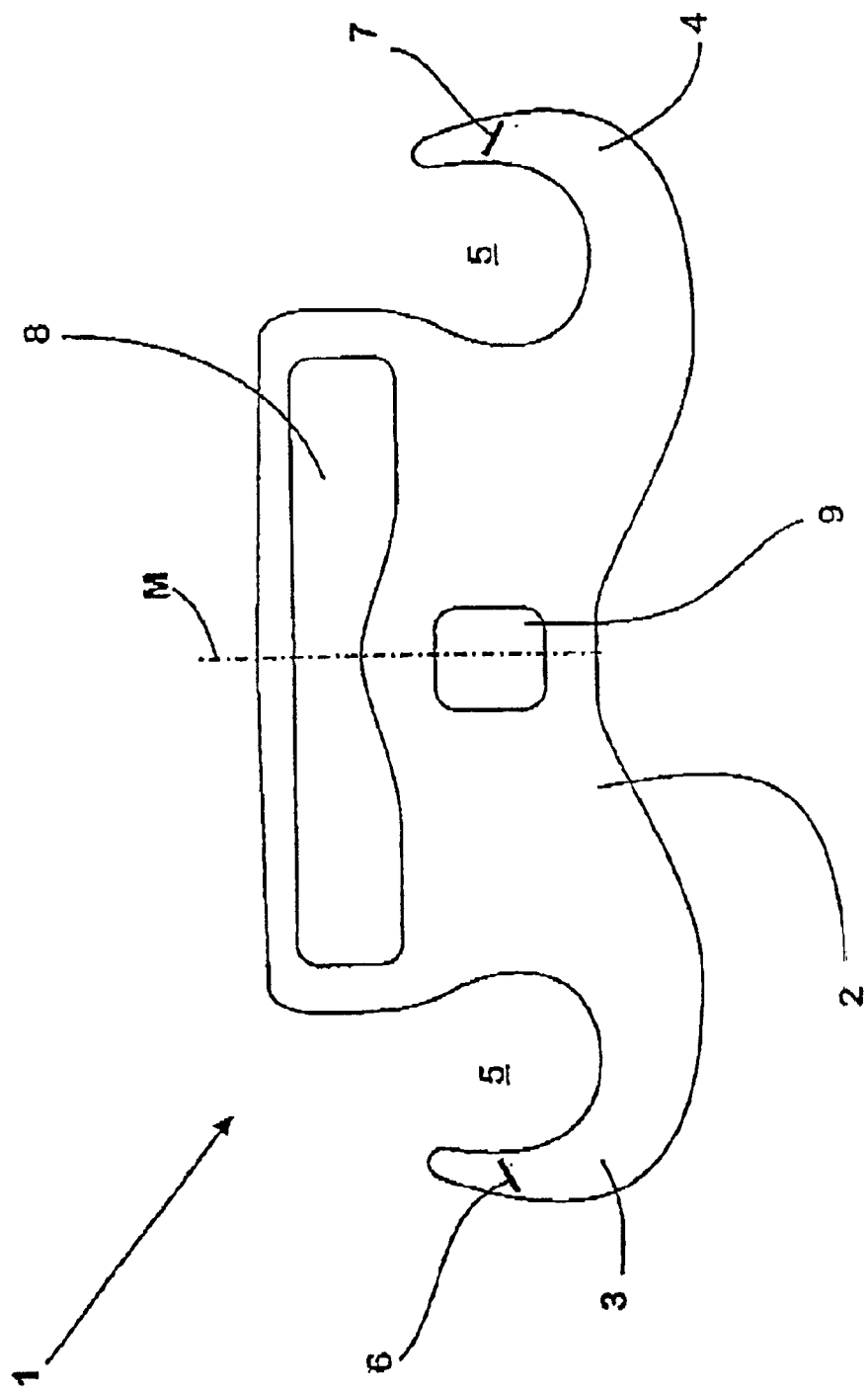
FIG. 1 is a carrier part used in a device for setting the effective length of a stop means, front view.

The device 1 for adjusting the effective length Lw of a stop means A designed as a textile band folded into a continuous loop encompasses a carrier part 2, which is forged in a single piece out of metal material. The carrier plate 2 here exhibits two longitudinal sides aligned essentially horizontally in the operating position, and two narrow sides aligned essentially vertically in the operating position. A hook-shaped projection 3, 4 is molded onto each of the narrow sides of the carrier part 2. The hook opening 5 of the projections 3, 4 is here designed in such a way that the projections 3, 4 can be readily slung around by the stop means A without any danger of overlapping layers of the stop means A. Situated at the hook ends of the projections are optical markings 6, 7, which indicate a maximal permissible angle at which the respective load-bearing segments A11, A12 of the stop means A is guided from the carrier part 2 to a load L1 or L2. In practice, this maximal permissible angle measures 60°, for example.

Projections 3, 4 are arranged symmetrically to the middle axis M of the carrier part essentially running perpendicular in the operating position of the carrier part 2. Also symmetrically arranged to the middle axis M in the upper area of the carrier part 2 in the operating position is a wide opening 8, through which a loop segment As of the stop means A allocated to a lifting device H can be routed.

A second opening 9 is formed in the carrier plate 2 below the opening 8, and also symmetrically to the middle axis M. In the embodiment shown on FIG. 2, a deflection element 10 designed as a spring hook is secured in this opening by the force absorbing surface 12. By contrast, in the embodiment shown on FIG. 3, a hook-shaped deflection element 11 also aligned symmetrically to the middle axis M of the carrier plate 2 is molded onto the carrier plate 2 as a single piece. The segment Av of the stop means A that links the segments A11 and A12 in the area of the load L1, L2 to be transported is secured in the deflection devices 10, 11. In this way, loops S1, S2 are formed at the end of segments A11 and A12 that permit an easy, reliable coupling of the load L1, L2 and stop means A. At the same time, surfaces of the deflection elements 10, 11 that come into contact with stop means A are situated so far under the projections 3, 4 of the carrier plate 2 that the force introduced by the segment Av additionally stabilizes the position of the carrier part.

Figure 2:
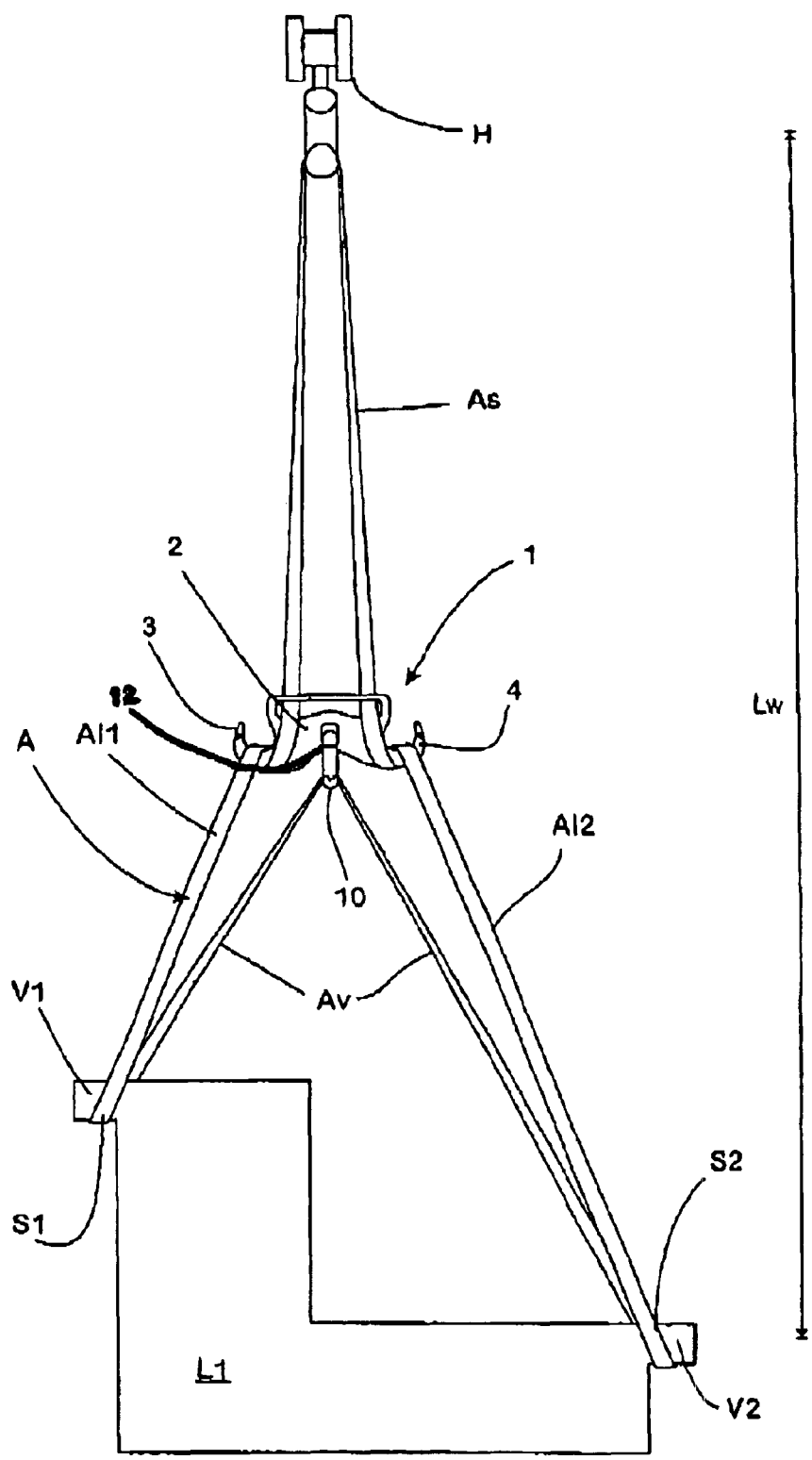
FIG. 2 is a device for lifting a load, front view.

The device 1 shown in FIG. 2 is used to lift the load L1. This load does not have any defined stop points. Instead, projections V1, V2 present on the load are used to couple the load L1 to the hook H of a transport device (not shown in any greater detail).

To this end, the loop segment As is routed from front to back through the opening 8 of the carrier part 2 and secured in the hook H, so that two lateral segments A11 and A12 of the stop means A are present, which connect the hook H with one of the respective projections V1, V2. Proceeding from the opening 8, these segments A11 and A12 are each slung once around one of the projections 3, 4 without overlapping each other, so that they come from the front side of the carrier part 2, and are routed to the respective projection V1, V2 of the load L1. The segment Av of the stop means A linking the ends of the segments A11 and A12 allocated to the projections V1, V2 is hooked into the deflection element 10, so that the load L1 with its projections V1, V2 is securely held in the loops S1, S2.

Figure 3:
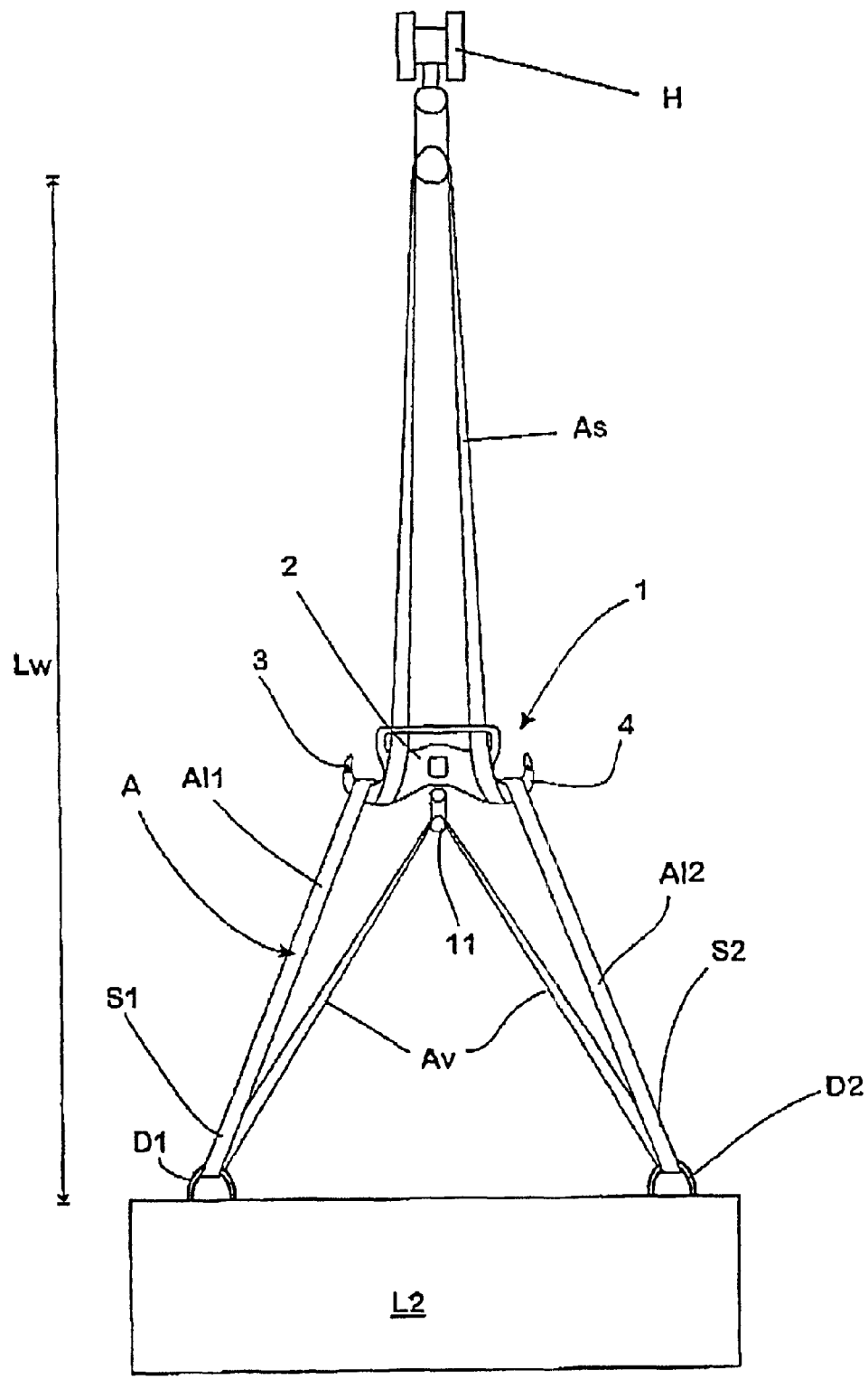
FIG. 3 is a device for lifting another load, front view.

In the embodiment shown on FIG. 3, the stop means A is guided with its segments A11 and A12 around the projections 3, 4 and with its loop segment As through the opening a of the carrier part 2 and secured in the hook H of the lifting device (not shown in greater detail), just as in the embodiment shown on FIG. 2. In a corresponding manner, the segment Av of the stop means A is secured in the hook-shaped deflection element 11 arranged on the side of the carrier plate 2 allocated to the load L2.

As opposed to the embodiment according to FIG. 2, however, the load L2 is fitted with defined stop points D1, D2 in the form of eyelets rigidly attached with the load L2. The loops S1, S2 are hooked into these eyelets, for which in particular suitable shackles, hooks or the like can be used.

For example, the effective length Lw of the stop means A to the distance existing between the hook H and the load L1 or L2 can be adjusted by shifting the carrier part 2 vertically in height in a load-free state. In conjunction with the above, the length of the essentially vertically running loop segment As and the length of the segments A11, A12 of the stop means A running at an angle from the carrier part 2 to the respective load L1 or L2 are changed. In this way, an upward shift of the carrier part 2 shortens the effective length Lw, while a downward shift increases the length Lw.

Key:
  1 Device 1 for adjusting effective length Lw
  2 Carrier part
  3, 4 Hook-shaped projections
  5 Hook opening of projections 3, 4
  6, 7 Optical markings
  8 Opening
  9 Opening
  10 Deflection element
  11 Deflection element
  A Stop means
  A11, A12 Load-bearing segments of stop means A
  As Loop segment
  As Loop segment of stop means
  Av Segment of stop means
  D1, D2 Stop point
  H Lifting device
  L1, L2 Load
  Lw Effective length
  M Middle axis of carrier part 2
  S1, S2 Loops
  V1, V2 Projections

What is claimed is:

1. A device for adjusting the effective length of a sling during transport of a load, said sling being designed as a continuous loop; said device comprising:

a carrier part, having projections located at each of two opposed spaced sides, each of said projections supporting a segment of said sling, said carrier part also having an opening through which a loop segment of the sling is guided, wherein the carrier part carries a deflection element in the area between the projections for deflecting an additional segment of the sling, and wherein the deflection element is pivoted in an opening of the carrier part.

2. A device according to claim 1, the projections are hook-shaped.

3. A device according to claim 1, wherein the projections have bulges or recesses that guide the sling.

4. A device according to claim 1, wherein the projections exhibit markings that denote a critical angle of the segment of the sling running away from the respective projection.

5. A device according to claim 1, wherein when said device is in operating position, the projections are essentially arranged in a shared horizontal plane.

6. A device according to claim 1, wherein the deflection element is attached to the carrier part via a force-absorbing surface located in a plane situated above the projections in the operating position of the device.

7. A device according to claim 1, wherein the deflection element and the projections are arranged symmetrically to a middle axis of the carrier part, wherein said middle axis of said carrier part is vertically aligned when the device is in the operating position.

8. A device according to claim 1, wherein the sling is a textile band folded or woven into a circular loop or a continuous rope.

9. A device for lifting a load with a sling, said sling being designed as a continuous loop connecting a lifting device with the load, and with a device for adjusting the effective length of the sling, said device comprising a carrier part and projections, located at each of two opposed spaced sides, each of said projections supporting a respective segment of the sling which links the lifting device to lifting points, said carrier part having an opening through which sloop segment of the sling is guided, by means of which the respective segments of the sling which link the load to the lifting device are coupled to the lifting device, wherein the carrier part carries a deflection element in the area between the projections for deflecting an additional segment of the sling, and wherein the deflection element is pivoted in an opening of the carrier part.

10. A device according to claim 9, wherein the sling is a textile band folded or woven into a circular loop or a continuous rope.

* * * * *